(12) United States Patent
Fischel

(10) Patent No.: US 8,147,767 B2
(45) Date of Patent: *Apr. 3, 2012

(54) CHEMICAL PROCESS ACCELERATOR SYSTEMS UTILIZING TAYLOR VORTEX FLOWS

(75) Inventor: Halbert Fischel, Santa Barbara, CA (US)

(73) Assignee: Global Energy Science, LLC, Santa Barbara, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 12/800,657

(22) Filed: May 20, 2010

(65) Prior Publication Data

US 2010/0329947 A1    Dec. 30, 2010

Related U.S. Application Data

(60) Provisional application No. 61/220,583, filed on Jun. 26, 2009.

(51) Int. Cl.
*B01J 19/00* (2006.01)
*B01J 8/08* (2006.01)
*B01J 8/02* (2006.01)
*B01J 35/02* (2006.01)

(52) U.S. Cl. ......... 422/198; 422/129; 422/209; 422/211

(58) Field of Classification Search .................. 422/129, 422/198, 209, 211; 977/700
See application file for complete search history.

(56) References Cited

U.S. PATENT DOCUMENTS

| | | | | |
|---|---|---|---|---|
| 3,355,382 A | * | 11/1967 | Huntington | 210/637 |
| 4,175,871 A | * | 11/1979 | Suh et al. | 366/79 |
| 5,830,593 A | | 11/1998 | Nielson | |
| 6,319,293 B1 | | 11/2001 | Debe et al. | |
| 6,471,392 B1 | | 10/2002 | Holl | |
| 7,122,161 B1 | * | 10/2006 | Moritz et al. | 422/209 |
| 7,488,547 B1 | | 2/2009 | Iacovelli | |
| 7,651,670 B2 | * | 1/2010 | Jung et al. | 422/209 |
| 8,017,261 B2 | * | 9/2011 | Halbert | 429/69 |
| 2004/0013587 A1 | * | 1/2004 | Holl et al. | 422/224 |
| 2006/0062702 A1 | | 3/2006 | Hagemeister et al. | |
| 2007/0020142 A1 | | 1/2007 | Federspiel et al. | |
| 2008/0149050 A1 | | 6/2008 | Shih et al. | |
| 2009/0053811 A1 | * | 2/2009 | Black et al. | 435/384 |
| 2009/0081340 A1 | * | 3/2009 | Forney | 426/248 |

FOREIGN PATENT DOCUMENTS

DE        4207819 A1 *  9/1993
(Continued)

OTHER PUBLICATIONS

Machine translation of DE 4207819 A1, which was published Sep. 1993.*

(Continued)

*Primary Examiner* — Walter D Griffin
*Assistant Examiner* — Natasha Young
(74) *Attorney, Agent, or Firm* — Seldon L. Epstein; Malcolm J. Chisholm, Jr.; Pamela J. Curbelo

(57) ABSTRACT

Chemical process accelerator systems comprising viscid fluid Taylor Vortex Flows (98, 50*a*) with high-shear-rate laminar Circular Couette Flows (58) in contact with catalysts (92, 92', 30, 32, 32*f*, 32*g*, 36, 40, 44, 45, 46, 47, 48), catalytic compositions and structures in chemical reactors and electrochemical cells (e.g. fuel cells, fuel reformers) are disclosed.

28 Claims, 6 Drawing Sheets

FOREIGN PATENT DOCUMENTS

WO    WO 2007/039726 A1 *   4/2007

OTHER PUBLICATIONS

Gabe et al, The rotating cylinder electrode: a recent development, Reviews of Applied Electrochemistry 6, J. of Applied Electrochemistry 13 (1983) pp. 3-22.

Gabe et al, The rotating cylinder electrode: its continued development and application, Reviews of Applied Electrochemistry 49, J. of Applied Electrochemistry 28 (1998) pp. 759-780.

Bagotsky, Fundamentals of Chemistry, Second Edition, John Wiley & Sons, Inc., Hoboken, NJ, USA, © 2006, §4.4—Convective Transport, pp. 60-67.

Newman, Electrochemical Systems, Third Edition, John Wiley & Sons, Inc., Hoboken, NJ, USA, © 2004, Chapter 17—Convective-Transport Problems, §17.3-§17.8, pp. 382-399.

Taylor, Stability of a Viscous Liquid Contained Between Two Rotating Cylinders, Philosophical Transactions of the Royal Society of London. Series A, Containing Papers of a Mathematical of Physical Character, vol. 223 (1923) pp. 289-343.

Newman, Electrochemical Systems, Third Edition, John Wiley & Sons, Inc., Hoboken, NJ, USA, © 2004, Chapter 1—Introduction, §1.4 Transport, pp. 8-18.

* cited by examiner

AXIAL   FLOW

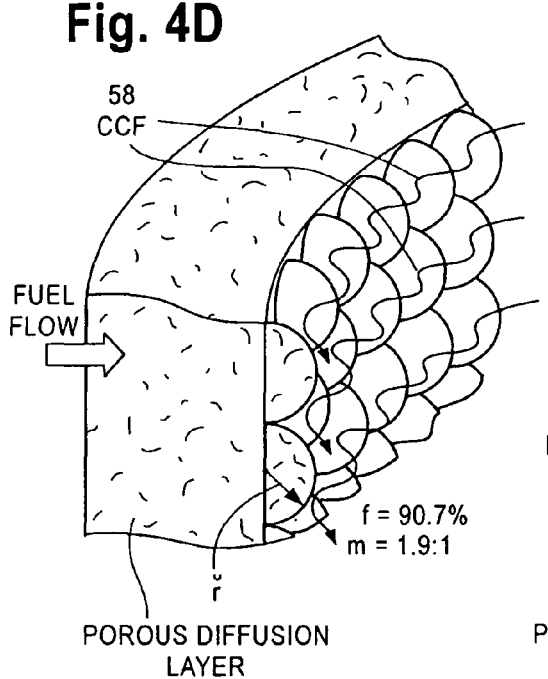
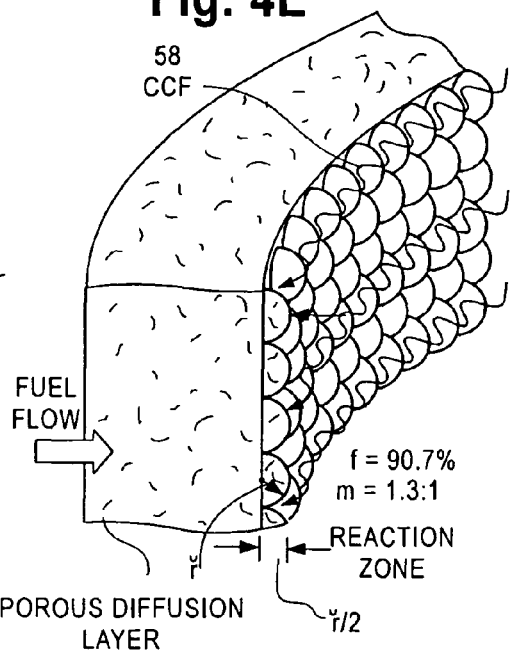
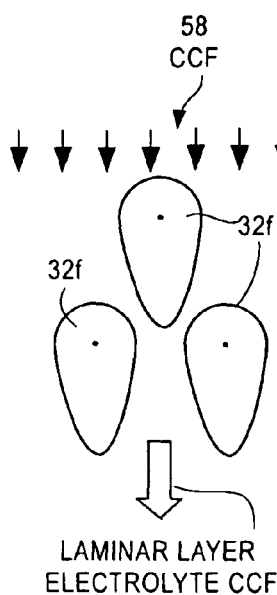
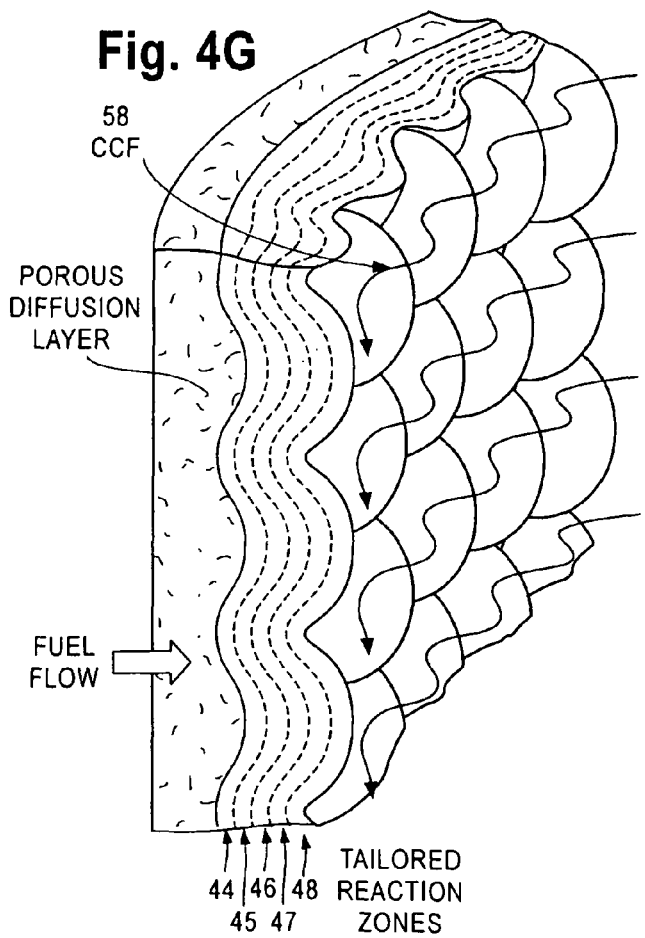

US 8,147,767 B2

CHEMICAL PROCESS ACCELERATOR SYSTEMS UTILIZING TAYLOR VORTEX FLOWS

CROSS-REFERENCE TO RELATED APPLICATIONS

This application claims the benefit of U.S. Provisional Application No. 61/220,583 filed 26 Jun. 2009 by Halbert P. Fischel, which is incorporated herein by reference.

This application, identified as Case C, is related to the following applications of Halbert P. Fischel:

Case A: Electrochemical Cells Utilizing Taylor Vortex Flows, Ser. No. 12/800,658 of 20 May 2010, now U.S. Pat. No. 8,017,261 of 13 Sep. 2011;

Case A1: Electrochemical Cells Utilizing Taylor Vortex Flows, Ser. No. 13/194,049 of 29 Jul. 2011, which is a division of Case A;

Case B: Fuel Reformers Utilizing Taylor Vortex Flows, application Ser. No. 12/800,710 of 20 May 2010, now Publication No. US 2010/0330445 A1 of 30 Dec. 2010;

Case D: Direct Reaction Fuel Cells Utilizing Taylor Vortex Flows, application Ser. No. 12/800,672 of 20 May 2010, now U.S. Pat. No. 7,972,747 of 5 Jul. 2011; and Case E: Dynamic Accelerated Reaction Batteries, application Ser. No. 12/800,709 of 20 May 2010 with Philip Michael Lubin and Daniel Timothy Lubin, now U.S. Pat. No. 7,964,301 of 21 Jun. 2011.

Case A, Case B, Case C (this case), Case D and Case E were all filed on the same day. All of these applications have been assigned to the same assignee. The other applications are incorporated herein by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF INVENTION

1. Field of the Invention

This invention is in the field of chemical process accelerator systems (U.S. Class 502/2, Int. Class B01J 35/00) comprising catalysts supported in high-shear-rate laminar flows created by Taylor Vortex Flows (TVF) and Circular Couette Flows (CCF) in a viscid fluid such as a reactant or an electrolyte in a chemical reactor or electrochemical cell.

2. Description of Related Art

Chemical process accelerator systems are used to increase or decrease speeds of chemical reactions or to selectively control intermediate reactions, compositions of final products or rates at which reactants are converted to final products or to electrical energy. They comprise two essential and cooperating components; namely, a) flow created in fluid reactant or electrolyte of a chemical reactor or electrochemical cell and b) a catalyst supported in the flow. The prior art teaches that the flow can be either turbulent or laminar.

Chemical processors require catalysts to promote reactions at acceptable commercial rates. Catalysts must be carefully engineered for a particular reaction or application. Although the prior art technologists consider catalysts as the most prominent constituents and they garner an overwhelming share of research investigation, catalysts are only one component of chemical process accelerator systems needed to achieve commercially viable reaction rates.

In their search for the catalyst equivalent of the Philosopher's Stone, researchers have examined numerous substances, metals, alloys, fabrication technologies and methodologies for forming and decorating catalysts and supporting structures. Nevertheless with few exceptions, improvements in catalyst performance have been modestly evolutionary rather than revolutionary. For example, prior art fuel cell catalysts have yet to break a longstanding barrier that will enable fuel cell electrodes to generate more than 1-Ampere per $cm^2$ of electrode surface area over a long operating life without being poisoned by reactants or corroding to the point of uselessness.

In the case of electrochemical cells—and more specifically fuel cells, extensive research is now being conducted with half-cell analyses of a wide variety of catalysts; however, there is yet to be any significant improvement in fuel cell performance. One reason is that catalyst performance in these half cell experiments is focused on measuring Oxygen Reduction Reaction (ORR) rates for catalytic cathodes paired against either a Standard Hydrogen Electrode (SHE) or a Reversible Hydrogen Electrode (RHE). Because SHE and RHE half cell experiments are usually run at or near room temperature, at pressures of about 1-bar and with little or no fluid flow, they cannot replicate operating conditions in chemical reactors, such as fuel cells, where these parameters and intermediate reaction products will most certainly be different.

Factors that determine characteristics of catalytic compositions include the purpose of the chemical process, the method of operating the process and choices for reactant chemicals, temperatures, pressures, processing times, intermediate reactions, reaction byproducts capable of poisoning the catalysts, balance of plant (BOP) and other variables. But perhaps more important is the nature of reactions at and very near the surface of catalyst and these are heavily controlled by the characteristics of fluid flows at and near the catalyst surface where turbulence is either intended or a consequence of design (e.g. rough surfaces).

The rate at which catalytic chemical reactions proceed is restricted by two factors called a) transport-limiting and b) surface-limiting. Transport-limiting occurs because reactants are impeded in reaching or leaving catalyst sites. Surface-limiting occurs because of a tradeoff between the sum of reaction energies from primary and intermediate chemicals, surface attraction of ions such as $H^+$ and $OH^-$ and poisoning rates by reaction products, such as CO. In addition, there can be tradeoffs between transport-limited and surface-limited factors, such as how changes in flow rates and pressures that promote chemicals moving to or from catalyst sites can change concentrations of intermediate chemicals capable of adhering to the catalyst surfaces, poisoning catalysts or, at least, retarding reactions. Thus in conventional chemical reactors, catalyst compositions are often designed to optimize results by making appropriate tradeoffs.

SUMMARY OF THE INVENTION

This invention provides chemical process accelerator systems comprising catalysts and high-shear-rate laminar flows called Circular Couette Flows (CCF) that are created by Taylor Vortex Flows (TVF) in a viscid fluid such as a reactant or an electrolyte in a chemical reactor or electrochemical cell. A viscid fluid is a viscous fluid that is capable of adhering or wetting a catalyst surface. A viscous fluid that cannot adhere or wet a surface is called an inviscid fluid. Additionally, catalysts optimized for use with TVF laminar flows are also taught.

TVF (also known as Taylor-Couette Flows) can be used in chemical reactors to achieve enhanced reaction rates and product extraction efficiencies by:
  generating high-shear-rate laminar CCF at catalyst surfaces for accelerating mass transport of reactants,
  simultaneously and rapidly removing intermediate reaction products that otherwise could adhere to catalyst surfaces from the reaction,
  promoting reactions that do not create undesirable intermediate reaction products,
  preventing strong carbon adhesion to catalyst surfaces, Embodiments to be described here are fuel reformers (Case B) and fuel cells (Case A and Case D). However, the principles to be described apply to other chemical reactors, electrochemical cells and processes.

Fuel reformers, as described in Case B, are used to extract $H_2$ from hydrocarbon fuels, such as methane or methanol, and other chemicals that are high in hydrogen content, such as sodium borohydride. TVF high-shear-rate laminar CCF increase the rate of $H_2$ generation in fuel/catalyst reactions and facilitate removal of the $H_2$ through filter media. Similarly, fuel cells utilizing TVF high-shear-rate laminar CCF to achieve high power densities are described in Case A and in Case D. Also, catalytic compositions of this invention that present high surface area/projected area ratios to reactive chemicals are described below.

Mechanical systems generating TVF are well known in the prior art of particulate filtration. For example, the following U.S. patents describe systems employing TVF for filtering blood without clogging a plasmapheresis membrane filter:

| # | Date | Title | Inventor |
| --- | --- | --- | --- |
| 4,755,300 | July 1988 | Couette Membrane Filtration Apparatus | Fischel, R et al. |
| 4,808,307 | February 1989 | Couette Membrane Filtration Apparatus | Fischel, R et al |
| 4,919,817 | April 1990 | Blood Cell Washing Systems & Method | Schoendorfer et a |
| 5,034,135 | July 1991 | Blood Fractionation System & Method | Fischel, H. |
| 5,053,121 | October 1991 | Blood Cell Washing System & Methods | Schoendorfer et a |
| 5,194,145 | March 1993 | Method . . . For Separation of Matter . . . | Schoendorfer |
| 5,376,263 | December 1994 | Pump Control Apparatus . . . Rotating . . . | Fischel, H. |
| 5,464,534 | November 1995 | Blood Fractionation System & Method | Fischel, H. |
| 5,738,792 | April 1998 | Method For Separation of Matter . . . | Schoendorfer |
| 5,783,085 | July 1998 | Blood Fractionation Method | Fischel, H. | capturing reaction contaminants that can degrade both catalyst surfaces, and
  f) eliminating those degrading reaction products from the reactors.

When used in combination with catalysts—especially those optimized for use in or with TVF and laminar CCF, reactions rates and extraction efficiencies well beyond those taught by the prior art can be achieved.

TVF was first described by Sir Geoffrey Ingram Taylor in his seminal paper *Stability of a Viscous Liquid contained between Two Rotating Cylinders*, Phil. Trans. R. Soc. London (8 FEB. 1923), Vol. 223-A 612, pp. 289-343. TVF and CCF are also described in Case A, Case B and Case D.

TVF and CCF occur when a viscid fluid (e.g. fuel, electrolyte or reactant) is confined in a gap between two cylinders where one cylinder is rotating at an appropriate rate with respect to the other. This invention focuses on accelerator systems comprising catalytic compositions used with viscid chemicals in chemical reactors that generate TVF and CCF.

Taylor reported that when the differential velocity between the opposing cylinder surfaces forming a gap is increased to a range within observed minimum and maximum speeds, Couette flow becomes unstable. Then, a secondary steady-state is created that is characterized by contra-rotating, axisymmetric, toroidal vortices with unique properties. This secondary steady-state is known as TVF.

For low differential angular velocities, in terms of circumferential Reynolds number, $R_c$, the viscid flow is steady, purely azimuthal and known as Circular Couette Flow. Catalytic surfaces described here are components in chemical process accelerator systems in which TVF generate high-shear-rate laminar CCF of viscid fluids at the catalyst surfaces.

Particulate filters are readily distinguished from chemical reactors and cells (e.g. fuel reformers, fuel cells) because the filters 1) lack catalysts and 2) do not promote chemical reactions.

In particulate filters, such as these blood dialysis filters; a fluid, such as blood, containing a suspended particulate, such as blood cells, is pumped through a gap between opposing cylinder walls. One wall, usually the outer, is solid while the other is porous. The porous wall usually incorporates filter media and rotates within the outer wall. Fluid penetrates the filter media on the inner wall where TVF-accelerated laminar shear prevents particulates from entering and clogging the filter media pores. TVF trap the particulates and transport them to an exit from the gap to be purged from the system.

TVF have been investigated by others for use in electrochemical cells; however, results useful for fuel cells, fuel reformers and the like have not been reported. Gabe et al, "The rotating cylinder electrode: its continued development and application", J. of Applied Electrochemistry, No. 28 (1998), pages 759-780 contains a review of results achieved between 1982-1995 for rotating cylinder electrode applications such as electroplating, silver removal from photographic chemicals, electrophoretic separation of proteins and the like.

In every case where Gabe et al and others describe a rotating electrode, such as a rotating cylindrical electrode (RCE) used in conjunction with TVF, turbulent flow at catalyst surfaces is an objective for the purpose of increasing mass transport of a chemical. Gabe et al describe two of the main features of RCE at Page 760, where they state:

However, it is worth repeating the main features of RCE which give it unique experimental characteristics. These are:

(a) It generates turbulent convection at Re>100, thereby providing simulation conditions of this type of convection at relative low rotation rates.

...

(c) Mass transport is high and be further enhanced through development or use of roughened surface.

They conclude, at Page 778, that The RCE has now established itself as a major tool for studying electrochemical mass transport especially under turbulent conditions.

Gabe et al also describe examples of laminar flow in conjunction with rotating disc electrodes; however, none of these applications describe use of laminar flows that can prevent wasteful or dangerous crossovers of reactive chemicals—such as hydrogen and oxygen in a fuel cell—in a high-energy reactor or cell. There are numerous references teaching the use of laminar flow at catalyst surfaces; however, they describe low-speed, low-power devices that are incapable of producing TVF. What is missing from these teachings is a concept or practice of TVF and both how or why TVF produce many orders of magnitude more powerful laminar flow boundary layers over a catalyst surfaces that provide benefits of laminar flows; but, at enormously more powerful shear rates.

Chemical reactors and electrochemical cells incorporating catalyst compositions and generating TVF of this invention comprise different structures and employ TVF in a manner different from prior art mechanical filters, chemical reactors and electrochemical cells. For example, fuel reformers incorporate porous catalysts that must not be used as filters because contaminants will degrade catalytic efficiency. Inert make-up gas that compensates for the hydrogen extracted from fuel reformers passes through these catalyst compositions to maintain system pressure. A small amount of oxygen that is just sufficient to oxidize molecular carbon attached to the catalyst surfaces also passes through the porous catalyst compositions. Unconverted fuel, contaminants and especially carbon particles from pyrolysis are trapped by TVF and purged from the reformer as described in Case B.

TVF also generate laminar flows with high shear rates at catalytic composition surfaces of fuel reformers that promote $H_2$ production. The controlling factor for laminar shear rates is the minimum value of the hydro-dynamically defined Taylor number, $T_c$, above which desirable energetic vortices are fully established. Axial Poiseuille-type flow is further induced by injection of fuel and recirculation of make-up gas. Also, there is a strong dependence of the critical $T_c$ on the strength of axial flow, which is related to its characteristic Reynolds number, $R_a$.

Furthermore, there is a requirement to maintain laminar flow at catalyst composition surfaces while promoting TVF within fuel. Care must be taken to restrict the circumferential Reynolds number, $R_c$, to non-turbulent values. This is in direct contrast with some prior art systems, such as described by Gabe et al, where turbulence is used to promote chemical mixing.

A set of distinct variables define a particular range of permissible operating parameters to obtain TVF with high-shear-rate laminar flows at catalyst surfaces. These variables include predetermined ranges of: 1) temperature and pressure of gaseous fuels, 2) kinematic viscosity and density of the fluids being employed, 3) their respective rates of recirculation, 4) angular rotation speed, 5) surface characteristics of the electrodes and, 6) physical dimensions of the cell.

The present invention is a chemical process accelerator system comprising robust catalyst compositions in which viscid fuel, electrolyte or other chemical fluids pass between relatively rotating, cylindrical surfaces that cause TVF and high-shear-rate laminar CCF within the fluids to reduce both transport-limiting and surface-limiting of catalytic reactions. In addition, TVF facilitate removal of contaminants that could damage chemical reactors, chemical cells or catalysts.

It is therefore a first object of the present invention to provide robust chemical process accelerator systems comprising catalysts and TVF that are optimized for use in chemical reactors for reducing surface-limiting and transport-limiting characteristics of the catalysts.

A second object of this invention is to provide chemical process accelerator systems that generate high-shear-rate laminar CCF at catalyst surfaces.

A third object of this invention is to provide catalysts, TVF and CCF that rapidly remove intermediate products from catalyst surfaces to increase reaction rates in chemical reactors.

A fourth object of this invention is to provide catalysts, TVF and CCF that promote chemical reactions that do not create undesirable intermediate products.

A fifth object of this invention is to provide catalyst compositions optimized for use with TVF and CCF in chemical process accelerator systems of chemical reactors.

A sixth object of this invention is to provide chemical process accelerator systems that bring reactant chemicals to catalyst particle surfaces in high-shear-rate laminar flows having dimensions in the range of 2-5 nanometers, exchange intermediate reactants and then carry away ions, intermediate reaction products, fluids (e.g. water) or solids (e.g. carbon) that could reduce reaction rates or poison the catalyst particle surfaces with little delay.

A seventh object of this invention is to provide chemical process accelerator systems that bring reactant chemicals to catalyst surfaces capable of operating at substantially elevated temperatures that achieve enhanced reaction rates with inexpensive catalysts.

These and other objects of this invention are more fully set forth in the following description of a preferred embodiment of this invention.

BRIEF DESCRIPTIONS OF THE SEVERAL VIEWS OF THE DRAWINGS

FIG. 4D is a cross-sectional from a side of HCP catalyst protrusions of FIG. 4C where they comprise hemispheres of radii ř.

FIG. 4E is a cross-sectional from a side of HCP catalyst protrusions of FIG. 4C where they comprise hemispheres of radii ř and height ř/2 that extend into CCF.

FIG. 4F is a cross-sectional from the top view of catalyst protrusions that have streamlined profiles that reduce turbulence.

FIG. 4G is a cross-sectional view from a side of catalyst protrusions composed of multiple catalyst layers.

DETAILED DESCRIPTION OF THE INVENTION

A chemical processor accelerator system 10 comprises two principal components; namely, Taylor Vortex Flows (TVF) that generate high-shear-rate laminar Circular Couette Flows (CCF) and catalysts. While these components cooperate to promote chemical reactions in a wide variety of chemical reactors, each will be described separately in an embodiment taught in Case B, which discloses a fuel reformer used to extract $H_2$ from fuels. To assist the reader, element numbers of FIG. 1A and FIG. 1B used in the following description of the fuel reformer are the almost the same as those used in FIG. 5A and FIG. 5B of Case B.

Figure 1A:
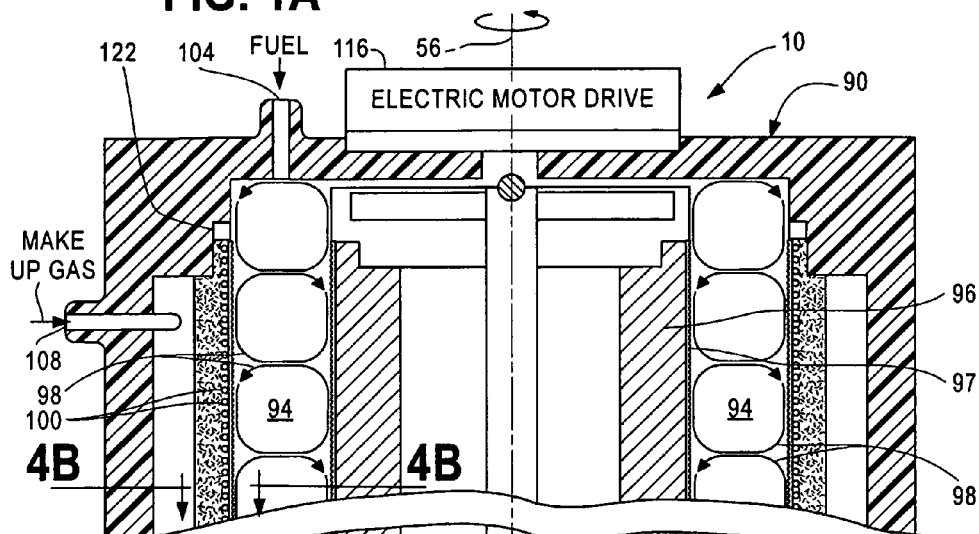
FIG. 1A and FIG. 1B are cross-section views of a chemical reactor external fuel reformer of Case B showing a chemical process accelerator system comprising TVF and a catalyst for generating hydrogen from a hydrocarbon fuel
Figure 1B:
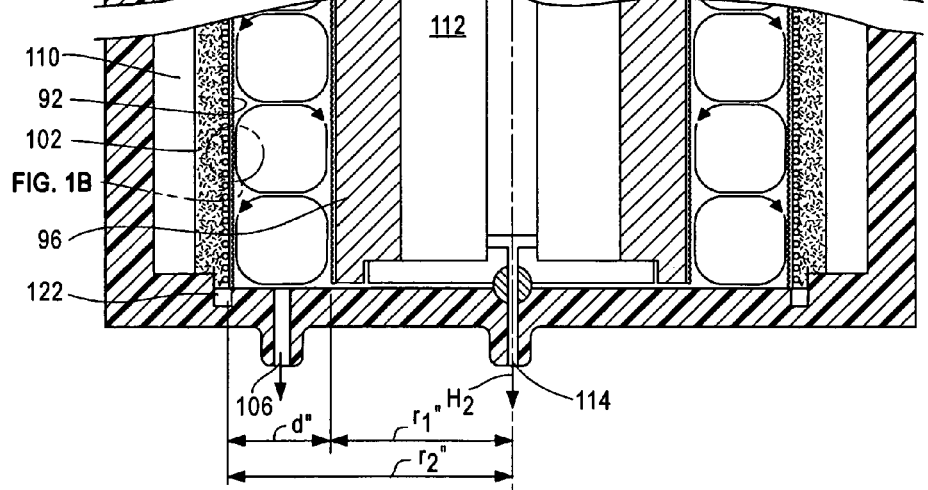
Figure 1B:
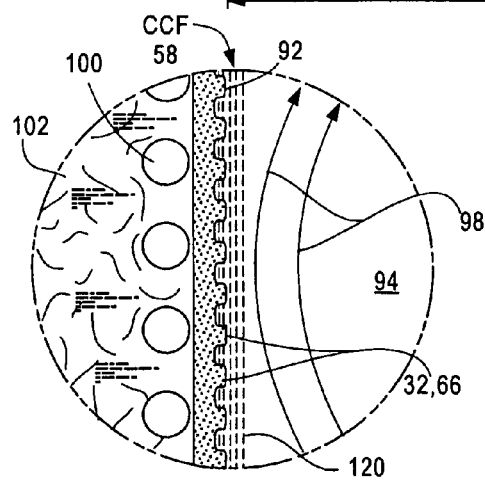

FIG. 1A and FIG. 1B are cross-sectional views of portions of an external TVF fuel reformer 90 suitable for a) pyrolytic or b) steam or partial oxidation reforming of hydrocarbon fuels such as methane ($CH_4$), methanol ($CH_3OH$), ethanol ($C_2H_5OH$), propane ($C_3H_8$), butane ($C_4H_{10}$), octane ($C_8H_{18}$), kerosene ($C_{12}H_{26}$) and gasoline as well as other hydrogen-bearing chemicals such as ammonia ($NH_3$) and sodium borohydride ($NaBH_4$). Note that FIG. 1A and FIG. 1B illustrate common structures that TVF reformers 90 share for each of these fuels. Balance-of-plant (BOP), as well as operating temperatures, pressures, chemical reactions, byproducts and contaminants capable of damaging catalytic surfaces or electrodes, are usually different for each of the different fuels.

The TVF fuel reformer 90 has one active cylindrical catalytic surface layer 92 having a radius $r_2''$ forming an outer wall of fuel chamber 94. The catalytic surface layer 92 is fixed in position. Cylindrical permeable filter 96 having an $H_2$-permeable cylindrical protective surface layer 97 and a radius $r_1''$ forms the inner wall of the fuel chamber 94 and is journaled for rotation within catalytic surface layer 92. The distance between the surface layer 92 and the surface layer 97 constitutes a gap d'' in which TVF 98 are formed. The TVF fuel reformer 90 could also be constructed with a rotating catalytic surface layer 92 and a fixed filter surface layer 97 or both surface layers 92 and 97 could rotate without departing from the scope of this invention. While the cylindrical surface layers 92 and 97 are shown in the drawings as right-circular and coaxial, these attributes are not a requirement and other cylinder-like geometries (e.g. elliptical, conical, hyperbolic, irregular, different axes) may be employed.

In one lower-cost embodiment, the catalytic surface layer 92 is constructed of catalytic nickel embedded in porous or otherwise permeable stainless steel. A choice of fuels may require use of a different catalytic material, such as copper cermets, platinum, palladium or gold on ceramic or precious or transition metal alloys. Iron-chromium catalyst is effective to promote a shift reaction in steam reforming. It is practical to mix several catalysts on the same substrate to cause rapid sequential reactions to drive the overall reaction to the preferred result or end product. The accelerated efficiency of the many reactions that can be implemented without carbon fouling is a direct result of TVF and CCF and is one advantage provided by this invention. This will be described in more detail after the following description of TVF and CCF.

The catalytic surface layer 92 abuts optional heating element 100, also shown in FIG. 1B, that provides thermal energy for an endothermic fuel reforming chemical reaction at the catalyst surface 92. The heating element 100 is typically supported by a #316 stainless steel web 102 that is porous to air, nitrogen or any inert gas.

Fuel for reforming (e.g. $CH_4$ or $CH_3OH$) enters the fuel chamber 94 through fuel entry port 104. Makeup gas, comprising soot-free inert gas from fuel chamber 94 passing through fuel chamber exit port 106, and additional external gas required to maintain pressure in fuel chamber 94 is pumped from BOP through makeup gas input port 108 and into makeup gas chamber 110. The makeup gas passes from makeup gas chamber 110 through porous web 102 into fuel reformer chamber 94. If a steam reforming and/or partial oxidation process is employed, then means for using exothermic energy to heat the catalyst 92 such as steam entering at makeup gas input port 108 along with such air supplying oxygen plus inert gas as required. For a basic pyrolysis process, make-up gas consists mainly of nitrogen or another inert gas plus just enough air/oxygen to prevent carbon adsorption on the catalyst surface layers.

In all cases, the hydrogen formed by interaction of the fuel gas with the hot (e.g. 700° C. for pyrolytic reforming) catalytic surface 92 passes through hydrogen-permeable filter element 96 into hydrogen capture chamber 112 and exits at hydrogen chamber exhaust port 114.

Because the catalytic surface layer 92 operates at about 700° C. for pyrolytic reforming, the entering gasses should be preheated by means for using exothermic energy to heat the catalyst 92 such as a BOP heat exchanger that utilizes waste heat from another process such as a fuel cell. The catalytic surface layer 92 may be entirely heated by gasses entering at makeup gas input port 108 instead of the separate heating element 100.

An electric motor 116 is coupled to cylindrical permeable filter 96 to cause it to rotate within cylindrical catalytic surface layer 92. The speed of rotation of permeable filter 96 and its protective surface layer 97 is dependent on a number of variables—including the input fuel, temperature and characteristics of the chemical reactor. Once the speed exceeds a minimum value, then the TVF 98 are generated in the chemical reactant, here the fuel, between surface layers 92 and 97 of FIG. 1A.

Fuel viscosities range between $2$-$4 \times 10^{-4}$ poise while densities range between $1.4$-$2.8 \times 10^{-2}$ gm/ml at the temperatures of approximately 700° C. and pressures of about 40-bars needed for pyrolysis. Most practical engineering values can be obtained by using kinematic viscosities of $3 \times 10^{-2}$ Stoke for pyrolytic reforming. More design information is described in Case A and Case B.

Figure 2A:
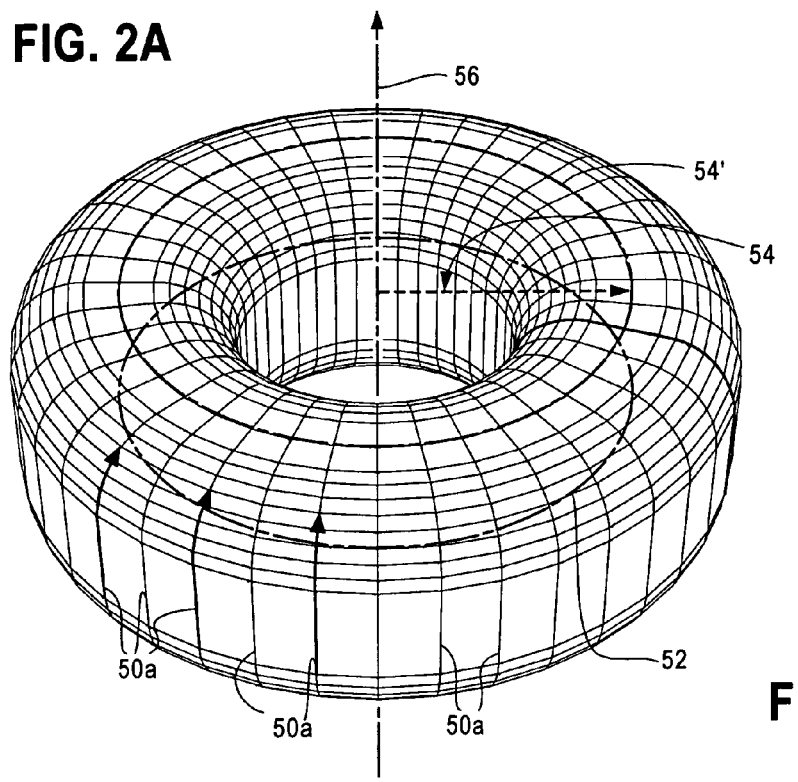
FIG. 2A, FIG. 2B and FIG. 2C are more detailed illustrations of TVF in a chemical reactor, such as the fuel reformer.
Figure 2B:
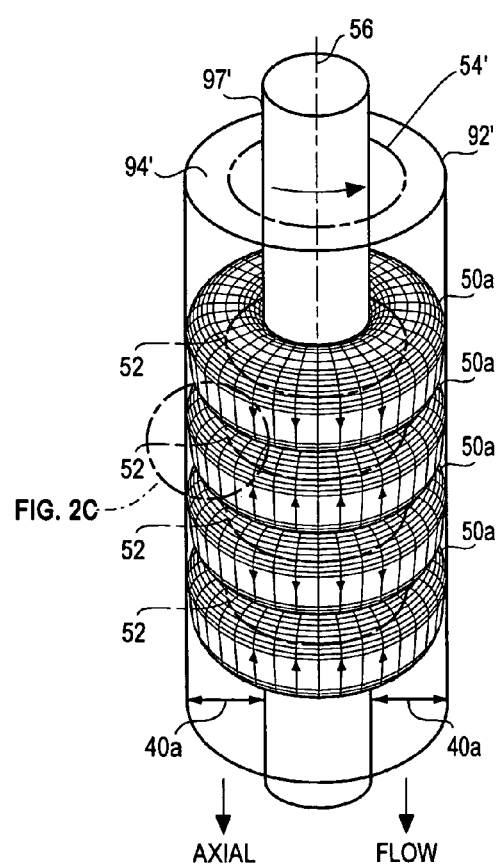
Figure 2C:
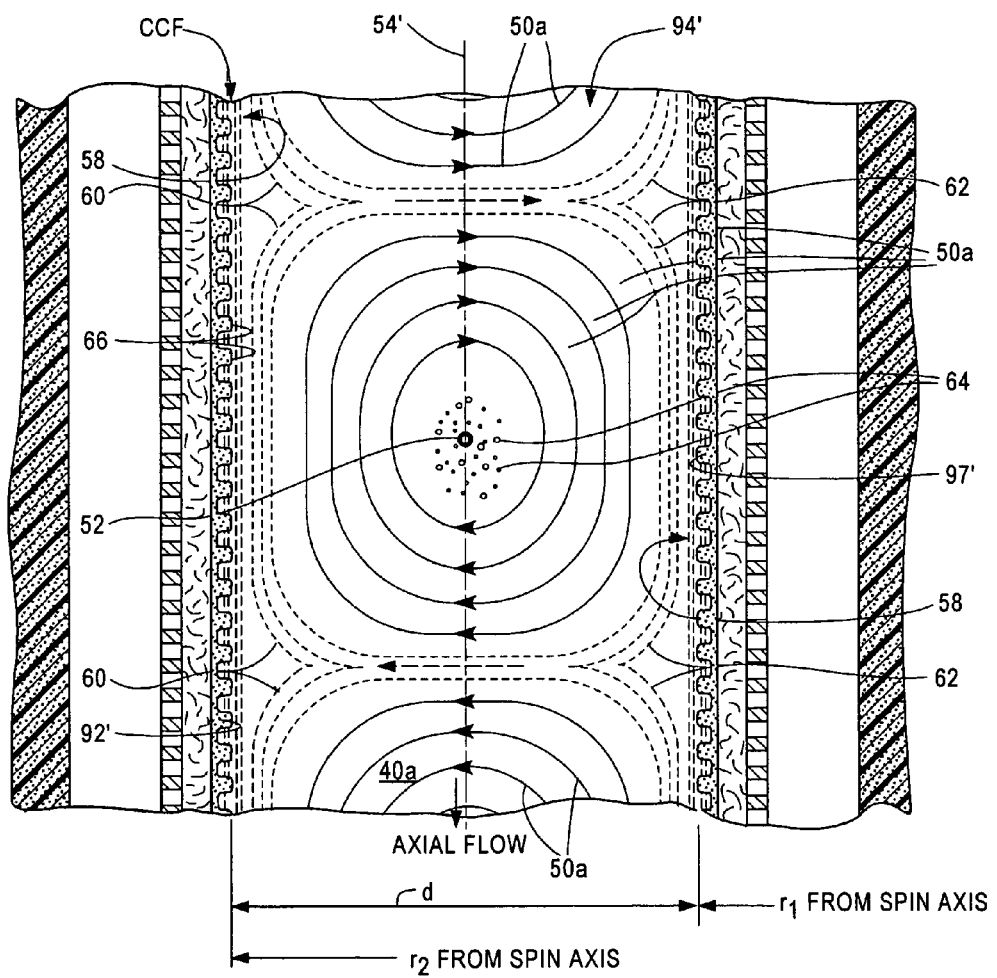

FIG. 2A, FIG. 2B and FIG. 2C are more detailed and somewhat idealized illustrations of Taylor Vortex Flows (TVF) between one set of facing active surfaces—such as fuel reformer 90 surface layers 92 and 97.

Taylor Vortex Flows 50a resemble doughnuts or, more technically, tori of fluid that rotate around their own axes 52. These tori spin axes 52 define planes that are perpendicular to the cross-section view plane of FIG. 2C. Vortex radii 54 extend from the reformer 90 spin axis 56 to the center 54' of fuel chamber 94 between the respective stationary and rotating surface layers 92 and 97.

As shown in FIG. 2B, several vortices 50a form an array that extends along the full axial length of fuel chamber 94' defined by surface layers 92' and 97'. Each vortex 50a is contra-rotating with respect to its adjacent vortex 50a. Diameters of vortexes 50a are slightly less than the width of the fuel chamber 94'.

Of critical importance to the invention is the fact that the entire array of vortices 50a is enveloped by a high-shear-rate laminar CCF boundary layer 58 (FIG. 2C) of rotating fluid almost fully covering each of surface layers 92' and 97' that enclose the array of vortices 50a. These thin layers of fluid are moving with high laminar shear perpendicularly to the sectional plane of FIG. 2C. Dimensions d, r1 and r2 in FIG. 2C correspond to dimensions d", r1 and r2, respectively, in FIG. 1A, In the case of the rotating surface layer 97', fluid moves most rapidly at and with that surface and least at the transition to vortex flow 62 a small distance away. In the case of the stationary surface 92', fluid moves most rapidly at the transition from vortex flow 60 and effectively zero at the stationary surface 92; again within a small distance.

The high velocities of these high-shear-rate laminar boundary layer 58 CCF and the very small distances over which they occur produce extremely high shear rates and consequently large mass transport coefficients. This invention takes further advantage of this very desirable condition by incorporating an active catalytic surface layers 92' with protuberances 66 of catalytically-active material that extend into the high-shear laminar-CCF 58 shown in FIG. 2C and disclosed in Case A, Case B and Case D. This greatly increases the amount of catalytic surface exposed to the high-shear-rate laminar flow.

U.S. Pat. No. 5,783,085 awarded for my invention of a Blood Fractionation Method discloses a process for separating plasma from whole blood with TVF. It describes the nature of the vortices and the high-shear-rate laminar flow boundary layer thicknesses that envelop them and as illustrated in FIGS. 2A. 2B and 2C.

My '085 blood plasma collection machine is used to remove undesirable suspended particulates from a fluid. The machine incorporates an inner rotating membrane filter to pass selectively fluid component to be separated from a particulate suspension without having particulates plug pores in the membrane.

A vortex will act on any particulate discontinuity with a pressure gradient that drives the particle to the low pressure center of the vortex axis. This occurs whether the particle is a buoyant bubble or denser component, such as particles and bubbles 64 of FIG. 2C. This is a feature that is especially useful for trapping carbon particles being discharged from the hydrogen cracking pyrolysis in the external fuel reformer 90 described in conjunction with FIG. 1A and FIG. 1B. Ions, on the other hand, are in solution and move hydrodynamically with the fluid or are driven by concentration differences through diffusion accelerated by shear forces.

An important feature of the TVF is illustrated in FIG. 2C where particles from a precipitate, including water attached to the precipitate (e.g. $NaBO_2$) and bubbles introduced into fuel chamber 94 are drawn into the centers of vortices 50a. The particles and bubbles 64 are formed during operation of the fuel reformer 90. The particles and bubbles 64 are not in actual solution as part of the fuel and are therefore subject to the flow dynamics just described. They will experience high pressure gradients caused by the TVF. These high gradients appear in both the high-shear-rate laminar CCF 58 and within the TVF 50a. These flows quickly drive the particles and bubbles 64 to the centers of the nearest vortices 50a where they remain trapped.

Vortices 50a move in axial flow through the fuel chamber 94. The particles and bubbles 64 trapped within vortices 50a are forced out of the fuel reformer 90 through fuel chamber exit port 106 along with their host vortices 50a. Thus, TVF 50a constitute means for extracting unwanted contaminants 64 from the fuel chamber 94. These unwanted contaminants 64 may include reaction precipitates, water, vapor, $CO_2$ and any gasses exiting catalyst surface 92, any of which can degrade the $H_2$.

In a chemical reactor, the molar volume of reactants processed at the catalyst/fluid interface can vary by many orders of magnitude as a function of several rate controlling factors, such as those described above. Chief among these is the amount of catalyst surface area in intimate contact with both the liquid and gas phases per unit area of catalyst/fluid interface.

FIG. 3A, FIG. 3B, FIG. 3C, FIG. 3D, FIG. 3E and FIG. 3F illustrate catalyst structures optimized for high liquid and gas phase contact per unit area of catalyst/fluid interface in high-shear-rate laminar CCF 58 generated by TVF 50a. These figures illustrate how to provide catalyst surfaces that provide intimate contact with a vigorously flowing electrolyte. Mass transport of ions by diffusion through stagnant liquid in conventional chemical and electrochemical cells is far slower than the movement of ions to (and product from) the catalyst surface layers adapted for use with high-shear-rate laminar fluid CCF 58 with high rates of viscous shear.

Figure 3A:
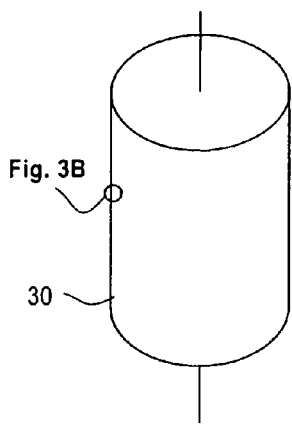
FIG. 3A is a perspective view of a chemical reactor catalyst of this invention
Figure 3B:
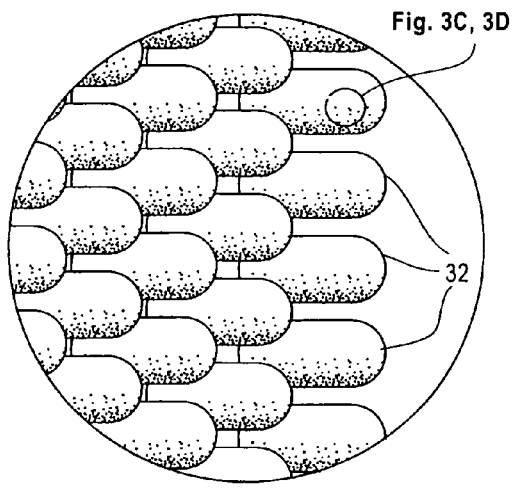
FIG. 3B is a perspective and magnified view of the surface layer of the catalyst of FIG. 3A.

FIG. 3A is a view of a cylindrical catalyst surface layer 30, such as surfaces 92 or 92'. A magnified view of the surface layer 30 is shown in FIG. 3B, where protuberances 32 are in a HCP array that may be formed by embossing the surface layer of the cylinder 30. The protuberances 32 have heights of approximately 25 μm and widths (diameters) of about 12 μm are shown extending from the cylinder 30 on a densely covered surface layer (e.g. 92, 92'). Those heights are sufficient to reach well into the high-laminar-shear boundary CCF 58 of FIG. 2C; but, no higher to avoid damage to the protuberances 32 from high-velocity TVF. The protuberances 32 are also shown in FIG. 1B where they extend into high-shear-rate CCF 58.

Figure 3C:
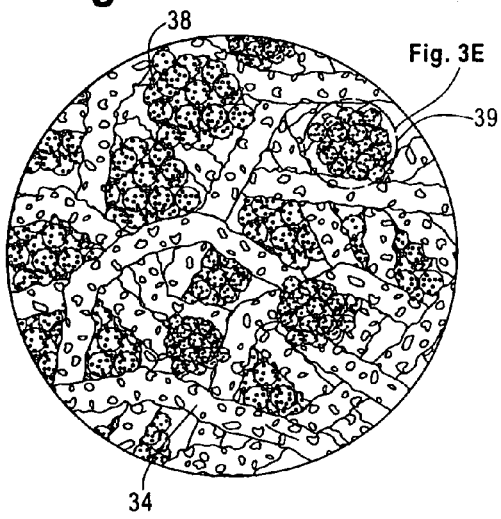
FIG. 3C is a highly-magnified view of one embodiment of the catalyst surface layer of FIG. 3B.
Figure 3D:
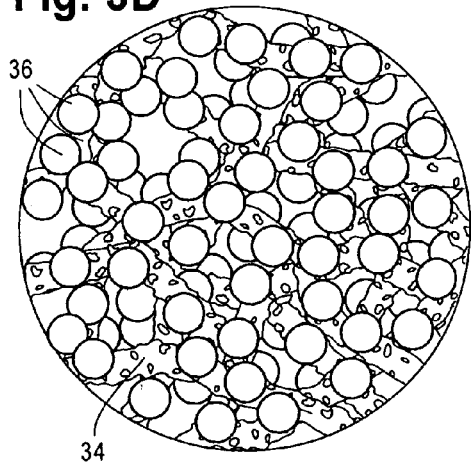
FIG. 3D is a highly-magnified view of another embodiment of the catalyst surface layer of FIG. 3B.

FIG. 3C and FIG. 3D are further magnified views of the structures of the protuberances 32. As shown in FIG. 3C and FIG. 3D, the protuberances 32 are formed from a sparse mesh of fine filaments. 34. Where used in an electrochemical cell, tungsten (W) is often preferred because it is electrically conductive, has a very high melting temperature and is both mechanically and chemically stable. Nanoporous Periodic Table of the Elements Platinum Metals Group (e.g. platinum) element and alloy foam sponge, Periodic Table of the Elements Group 10 (e.g. nickel) foam sponges, copper foam sponges, gold foam sponges and perovskite structure alloy sponges are also suitable for this purpose. The use of sparse mesh makes the protuberances 32 porous to fluid chemicals, such as fuels and electrolytes.

Figure 3E:
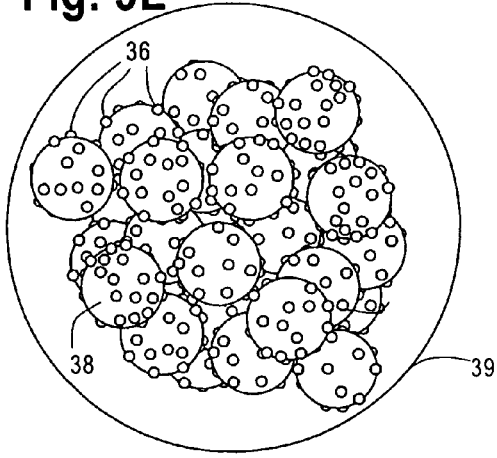
FIG. 3E is a more highly-magnified view of the catalyst surface layer of FIG. 3C.

Referring to FIGS. 3C and 3E, there is a successive hierarchy of structures that form the protuberances 32. FIG. 3C, showing a magnification of the protuberances 32, displays the mesoporosity between aggregate clumps of Platinum Metals Group catalyst particles 36 adhered to carbon balls 38 having interstices of approximately 300 to 1000 nm. These are of sufficient width and breadth to permit moderate interstitial laminar flow of fluid through the mesopores. In addition, capillary action through the interstices contributes to the amount of electrolyte available for reaction. The degree of interstitial wetting will depend upon electrolyte viscosity and wetting angle, both of which are very high for electrolytes such as phosphoric acid and simple hydroxides.

The diameters (widths, if non-circular) of the protuberances 32 are nominally 12.5 µm. Therefore, there each protuberance 32 will contain approximately 12 to 15 aggregate carbon balls 38 across its diameter (width).

At a higher level of magnification the micro-porous structure of the aggregate 800 nm wide clusters of 40 nm diameter carbon balls 38 decorated with 2 nm width catalyst particles 36 can be identified. Typically for gas fuel or oxidizer, the catalyst bearing carbon particles 38 are held together by interstitial filamentary PTFE (not shown) to promote gas access. By comparison, a typical electrode applied to a PEM membrane that transports ions by dragging water molecules through its polymer chain interstices has a depth of about 30,000 nm.

Normally, the PTFE polymer would be an acidic-solubilized version of Proton Exchange Membrane (PEM) material for acidic electrolytes. For alkali electrolytes, an alkaline or merely hydrophilic polymer could be used. In either case, the diameter of the aggregate clump of roughly spherical carbon particles 38, each having a diameter of 40 nm and dotted with 2 nm catalyst particles 36, is about 800 nm. The longest or deepest shear-enhanced diffusion path for ions or other reactants to reach active catalyst surfaces is about 400 nm.

The fluid chemicals penetrating the protuberances 32 can wet catalysts, such as platinum (Pt) or its alloys containing ruthenium (Ru), palladium (Pd) or other elements from the Platinum Metals Group. In FIG. 3E, catalyst particles 36 decorate clusters of porous carbon balls 38, which are also shown in FIG. 3C attached to the filaments 34. Alternatively, catalyst particles 38 can decorate the filaments 34 as shown in FIG. 3D.

Current advances in carbon-dispersed Pt catalyst technology, as shown in FIG. 3E, have reduced crystallite or grain size of the catalyst particles 36 to 2-nm and increased specific surface area of catalyst to 100-meters$^2$ per gram at current loadings of as much as 0.5 to 0.1 mg/cm$^2$ for fuel cell electrodes. In other words, it is already possible to multiply the effective catalyst area per unit area of electrode by factors of 500 to 1,000, respectively, and well beyond that by simply restructuring the catalytic surfaces 30, 92, 92'.

Net catalyst loading factors can be increased by at least an order of magnitude by attaching Pt catalyst particles 36 to conventional, electrically-conducting aggregate carbon balls 38—the balls each having diameters between 20 and 50-nm. These aggregate carbon balls 38 are normally supported by mesoporous carbon structures, which are fluid permeable. Available versions of these carbon materials have a void volume of 60% after impregnation with 40% by weight of PTFE to make them wet-proof. The composite has approximately 5 to 10 nm nano-pores separating the catalyst decorated carbon spheres 38 that tend to aggregate into clumps of 400 to 800 nm across—similar to that shown in FIG. 3E. The spaces between the aggregate carbon balls 38 are also in the range of 400 to 800 nm across. These catalyst structures form the 12,500 nm (12.5 µm) diameter electrode protuberances 66, 32.

When used in fuel cell electrodes—as in Case A and Case D, the protuberances 32 provide an approximate 4-fold increase in electrode/interface area ratio. That, combined with a 250% increase in the catalyst particle 36 loading, contributes to 10-times the catalyst surface area available to electrode reactions over present practice and an expected 10-fold increase in open circuit exchange current. The actual operating current increase under load will be less due to ohmic and other losses; but, these losses can be minimized by using thicker materials.

Figure 3F:
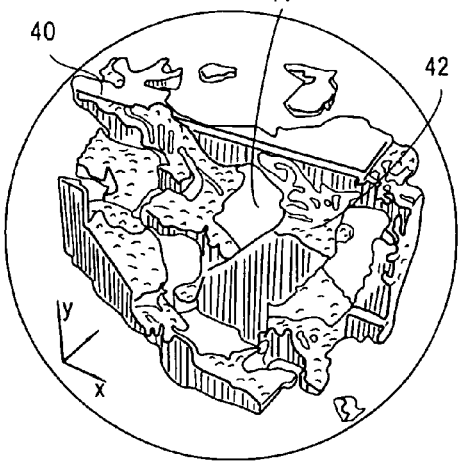
FIG. 3F is a computer-simulated view of another catalytic electrode surface layer.

FIG. 3F is a drawing made from a computer-simulated view of an alternative electrode fabricated from nanoporous metal foam sponge or scaffold 140, which is capable of absorbing fluids (e.g., electrolytes and fuels). The view appeared as FIG. 4 of Pugh et al, "Formation of nanoporous platinum by selective dissolution of Cu from $Cu_{0.75}Pt_{0.25}$", J. Material Research, Vol. 18, No. 1, January 2003, pages 216-221. Coordinate vectors x, y, z are provided as a reference frame. The view covers a volume measuring 14×14×7 nm. Pugh et al used 0.28 nm pixel spacing in calculating their image, which is the atomic radius of a Pt atom. Pugh et al estimated sizes by "taking chord length measurements on the image".

Pugh et al were able to produce isotropic 3-dimensional open-pore-structure foam with 3.4 nm pores and somewhat smaller diameter scaffold struts 144 (called "ligaments" by Pugh et al). They used a process in which one element (e.g., copper) was removed from an alloy (e.g., $Cu_{0.75}Pt_{0.25}$) by selective dissolution (e.g., leeching) to yield a nanoporous metal foam sponge (140) that will absorb electrolyte.

Using the metal alloy face-centered-cubic structural geometry described by Pugh et al and by others (e.g., Erlebacher, J., "An Atomistic Description of Dealloying—Porosity Evolution, the Critical Potential and Rate-Limiting Behavior", J. Electrochemical Society, Vol. 151, No. 10, 2004, pages C614-C626); the approximate relationship of open pore fraction, $\rho_v$ to the chord length, $l_c$ and diameter, D in Pugh et al is given by:

$$(1-\rho_v)=(0.75\pi x^2+x^3)/(1+x)^3$$

where:
$x=D/l_c$, and
$(D+l_c)$–nominal pore size

Using the metal alloy face-centered-cubic structural geometry described by Pugh et al and by others (e.g., Erlebacher, J., "An Atomistic Description of Dealloying—Porosity Evolution, the Critical Potential and Rate-Limiting Behavior", J. Electrochemical Society, Vol. 151, No. 10, 2004, pages C614-C626); the approximate relationship of open pore fraction, $\rho_v$ to the chord length, $l_c$ and diameter, D in Pugh et al is given by:

$$(1-\rho_v)=(0.75\pi x^2+x^3)/(1+x)^3$$

where:
$x=D/l_c$, and
$(D+l_c)$–nominal pore size

The higher power term cannot be ignored when D is a substantial fraction of $l_c$. The stated pore volume fraction is 0.75 based upon a starting Pt alloy concentration of 25% so that the chord diameter would calculate to approximately 2.0 nm for the smallest pore. The $D/l_c$ ratio is 0.58, which is a function of foam sponge geometry and pore volume fraction; but, does not vary for larger pore size results reported by Pugh et al. These dimensions can be increased by varying process parameters, such as de-alloying times, temperatures, applied voltages, solvents and alloy compositions. The metal foam sponge or scaffold 140 is an alternative, but similar, to the sparse metal mesh 34 of FIG. 3C and FIG. 3E.

The metal foam sponge 40 of FIG. 3F comprises a nanoporous metal scaffold 40 having open and permeable in 3-dimensions pores 41 of 5 to 15 nm contained by the scaffold struts 42, which have smaller dimensions. Metal or metal alloy or organic catalyst particles (not shown), similar to the catalyst particles 36, are attached to the scaffold struts 44 in a manner similar to that shown in FIG. 3D. The catalyst particles 36 are of about 2 to 7 nm in size for best surface area dispersion and catalyst activity. For DRFC, nickel and metals selected from the Platinum Metals Group (e.g. Pt, Ru) and their alloys are preferred catalyst materials for the particles 36 and the foam sponge scaffold 40.

Pugh et al described their metal foam pictured in their FIG. 4 as an open pore structure having 3.4 nm or larger pores 41 and comprising comparably sized Pt struts 42. Using x=0.58 and D=2 nm as calculated above, the ratio of exposed active catalyst area to projected electrode surface area is:

$$[3\pi x/(1+x)^2](T/P_D)$$

where:
 $P_D=(D+l_c)=$nominal pore 41 diameter,
 T=depth thickness of the electrolyte flow permeating electrode surface layers 92, and 92'
 D=diameter of the nanostruts 42 forming the pores 41.

In a 100 micron thick electrode having 75% open pore volume, 3.4 nm pores and 2.0 nm diameter struts 42, the area multiplication factor is 41,000 cm$^2$ of exposed reactive electrode surface area per cm$^2$ of projected electrode.

By comparison, the formula for an equivalent packing volume of spherical particles is $6(1-\rho_v)(T/D)$. Thus, the Pugh et al foam 40 has an exposed surface area comparable to spherical particles 36 with equivalent Pt volume loading. While supported particles 36 normally lose about half of their exposed area because of attachment requirements, the porous foam sponge struts 42 are fully exposed to reaction kinetics. Consequently, bare nanoporous foam sponges 40 are at least as effective as a catalyst dispersion mechanism as supported particles 36 of equivalent dimension; but, is a more stable structure.

A metal foam sponge 40, with an open pore volume of 75%, is more effective for the mass transport exposure of catalyst to TVF and CCF than supported particles 36. Even with pore 41 diameters of 25 nm, the active catalyst area ratio for a 100 micron thick catalyst layer is an unprecedented 8,750 cm$^2$ to 1 cm$^2$ of projected electrode area.

For a DRFC anode, the Pt nanoporous metal foam sponges 40 can be produced from an alloy having face-centered cubic geometry with a Miller Index of (1,1,1) and can be loaded with Ru or other catalytic particles 36 made from a colloidal suspension of the appropriate salts as taught in the prior art. The foam sponges 40, containing Ru particles 36, can be heat-treated so that the particles 36 are absorbed into the Pt struts 42 to form a foam sponge of 50:50 Pt—Ru alloy. Alternatively, a 5 to 15 nm Pt porous foam sponge 40 with 50:50 Pt—Ru particles of 2 to 5 nm size can be thermally attached by heat sputtering to the struts 41. Pure Pt will work for oxygen cathodes.

These catalyst surface layers 92, 92' of nanoporous foam sponges or scaffolds 40 are excellent electrical conductors and can be deposited on or secured to micro-porous substrates (e.g., stainless steel web 102) that will provide substantial strength for the catalyst surface layers 92, 92'. The micro-porous substrates 102 may be easily coated with a high-molecular-weight compound (e.g., PTFE) to protect them from corrosive attack by or premature hydrolysis of some fuels (e.g., borohydrides) and to keep the electrolyte from penetrating past the surface layers 92, 92'.

The surface layers 92, 92' comprising metal foam sponges 40 can be operated safely in alkaline environment at elevated temperatures in the range of 250 to 350° C. and at elevated pressures to achieve accelerated catalytic performance. The same structure and process can be used to build nanoporous catalytic surface layers 92, 92' from other metal foam sponges 40, such as gold, copper, tungsten and nickel. These layers, attached to substrates having surface geometries to be described below in conjunction with FIG. 4B, FIG. 4D, FIG. 4E, FIG. 4F and FIG. 4G, are ideally suited to take the fullest advantage of the unique flow profiles and mass transport enhancement of catalyzed electrochemical processes in fuel cells of this invention.

The catalyst particles 36 need a fluid or an electrolyte to wet, but not flood, them in a thin envelope of fluid or electrolyte so that chemical reactants can diffuse into the molecular fluid or electrolyte coating and react at the catalyst surfaces. For fuel cells, the boundary layer thicknesses for typical design parameters are about 0.05 mm, which are somewhat less than the thickness of proton exchange solid polymer membranes. However, one difference in current density is due to the rate of shear-amplified diffusion in a TVF cell compared to polymer interstitial transport. Typical laminar boundary layer shear rate in a TVF cell is as much as 15 to 20 times the nominal flow rate in a proton exchange membrane fuel cell (PEMFC).

The electrode protuberances 32 should extend about half, to at most three quarters, of the way into the high-shear-rate laminar flow layer 58; but, not into the TVF 50a where the protuberances 32 would be subjected to excessive viscous drag and possible damage or deterioration. The laminar flow layer 58 is less than 0.050 mm. thick. Therefore, the protuberances 32 should be approximately 0.025 to 0.038 mm in height.

Simple plane geometric calculations provide values for a) the fraction of electrode surface, f, covered by protuberances and b) the projected area ratio, m, of actual catalyst surface area to projected surface area.

Figure 4A:
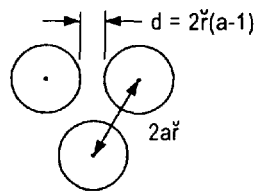
FIG. 4A is a cross-sectional view from the top of hexagonal close-packed (HCP) catalyst protrusions similar to protrusions shown in FIG. 3B where the protrusion are not in contact and their centers are separated by a distance of 2ař.

If the radii of idealized cylindrically-shaped protuberances 32 are equal to ř and the protuberances 32 are arranged in a HCP array with centers spaced 2.5ř apart, as shown in FIG. 4A, then they will cover very close to half the catalyst projected surface area so that f=50%.

Figure 4B:
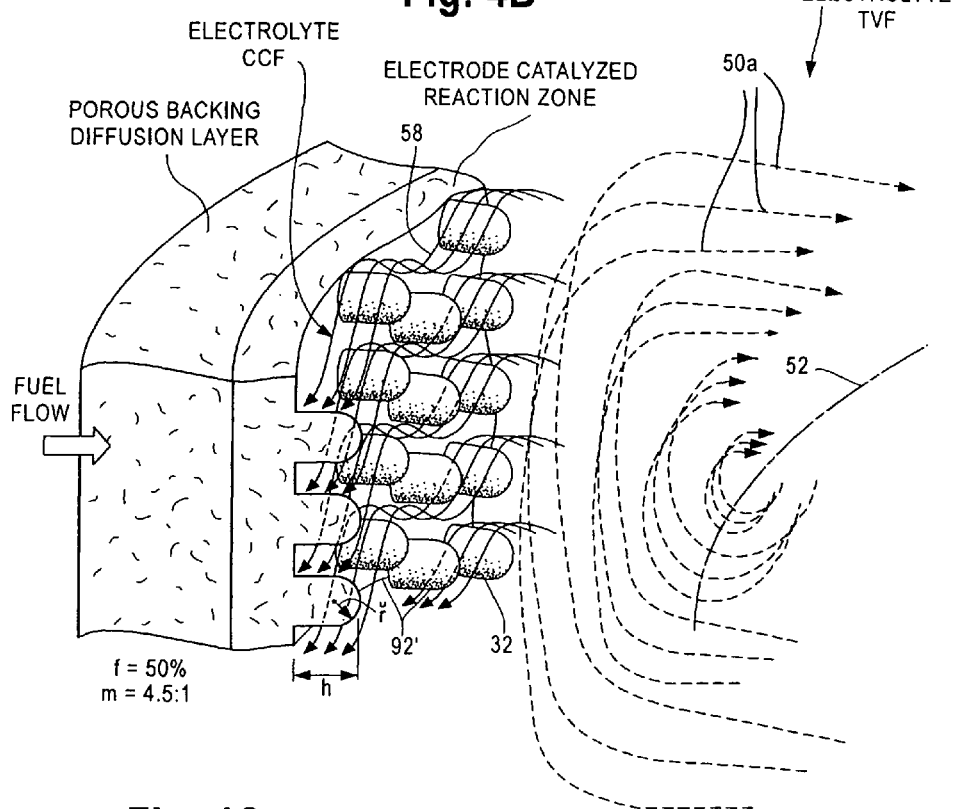
FIG. 4B is a cross-sectional view from a side of HCP catalyst electrode protuberances of FIG. 4A where they comprise cylinders of height h topped by hemispheres of radii ř that extend into CCF generated by TVF.

The surface area of a protuberance 32 is approximated by a hemispherical cap of area, $2\pi ř^2$ plus a supporting cylinder of area, $2\pi řh$ where h is the height of the projection. If the height, h, of each cylindrical portion is between 2ř to 4ř and is capped by a hemispherical dome of radius, ř, as shown in FIG. 4B, then the total external surface area of the protuberance is in the range of $6\pi ř^2$ to $10\pi ř^2$. Because the area of the portion of surface covered by a protuberance is $\pi ř^2$, the projected area ratio is 6 to 10 times f and the ratio of actual electrode surface area to projected area or area multiplier, m, is 3.5 to 5.5 for an average projected area of m=4.5:1.

FIG. 4B provides another view of the relationship between the TVF 50a rotating around the TVF axis 52 and the CCF 58. The CCF 58 are orthogonal to the TVF 50a and parallel to the TVF axis 52. The CCF 58 encompass protuberances 32 that extend from the electrode catalytic surface layer 30, 92' into the CCF 58.

Figure 4C:
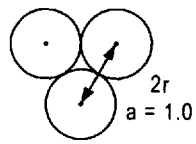
FIG. 4C is a cross-sectional view from the top of hexagonal close-packed (HCP) catalyst protrusions similar to protrusions shown in FIG. 3B where the protrusions are in contact.

FIG. 4C shows a HCP array where circles of radius ř are in contact and the gap between circles is zero. f=90.7% of the catalyst surface area. FIG. 4D shows an example where the protuberances are only hemisphere caps of radius ř embossed on the catalyst surface. These protuberances 32 have an effective surface area of $2\pi ř^2$ covering an area of $\pi ř^2$ for a ratio of 2:1 to 1. Therefore, 90.7% of the cylinder 30 area has a weighting factor of 2.0 and 9.3% of the cylinder 30, 92' area has a weighting of 1.0. The total net nominal area multiplier m=1.9:1.

Even if the caps of the protuberances 32 were only a portion of a hemisphere, e.g., half height or ř/2 as shown in FIG. 4E, 90.7% of the projected area would have a multiplier of 1.33 for a net multiplier of 1.3, which would represent a reasonable approximation for the minimum area multiplying effect of the projected geometry.

Whatever geometry of the protuberances 32 that may be selected within the range of this general description, it is intended that the total height, (h+ř) of the protuberances 32 be somewhat less than the thickness of a TVF boundary layer 58 of FIG. 2C.

Using this somewhat idealized geometry of the protuberances 32, where their centers are separated by a distance of 2ař, in the TVF laminar flow 58, the area multiplier, m, is:

$$m=1+(\pi/2a^2\sqrt{3})[(2h/\check{r})+1]:1$$

The choice of choice of protuberance parameters will depend upon the reactants and catalyst being used in conjunction with CCF 58.

The protuberances 32 preferably may have a streamlined shape, as shown for protuberances 32f of FIG. 4F, for insertion into the laminar flow boundary layer 58 of TVF 50a. Some prior art catalytic surfaces incorporate turbulent-producing projections that are designed purposely to promote chemical mixing for electrochemical processes and voltammetry. By contrast, the chemical process accelerator systems of this invention avoid turbulence and preserve laminar flow in the catalyzed reaction zone to be effective as a mass transport mechanism conveying reactants to and from actual catalytic surfaces. Also, the protuberances 32 and 32f should present high active surface areas to the laminar flow 58 per unit area of projected electrode in relation to the reaction zone depth.

In a typical and practical example for a $H_2/O_2$ fuel cell, the catalyzed reaction zone could have a depth of several microns and the CCF laminar boundary layer 58 would be somewhat in excess of 25 microns. With a net height of about 4-times the radius as in the just calculated example, the projections could have diameters of about 12.5 microns and are spaced on centers 15.625 μm apart. The electrode surface would have the appearance and smooth feel of 1000 to 1500 grit abrasive paper of the sort used to polish stone.

When fuel or oxidizer is converted by catalyst to a final molecule or ion in only one or two intermediate steps, it is generally adequate to use only one type of catalyst that is most ideally suited to the reaction in question. These reactions proceed to completion more quickly than those requiring multiple intermediate steps. In these cases, the electrode surface can have geometry similar to FIG. 4B with a projected area multiplier on the order of 4.5:1, as calculated above.

As shown in FIG. 4B, FIG. 4D, FIG. 4E and FIG. 4F, both fuel and oxidizer in a fuel cell pass through their respective electrodes in a cross-flow relationship without mass transport limitation and with sufficient residence time to complete their respective reactions—as taught in Case A and Case D, cited above. Neither is possible in PEMFC of the prior art. These cross-flows are orthogonal to high-shear-rate electrolyte CCF that both promote reaction rates and assist in moving undesirable products into TVF for elimination from the reactor or cell.

Chemical process accelerator systems taught here also improve the overall rate of slower reactions that produce multiple intermediate products prior to completion, such as the oxidation of methanol and other alcohols. FIG. 4G shows a catalyst comprising multiple layers of different types of catalyst materials. These are schematically depicted as catalyst layers 44, 45, 46, 47 and 48. Each of the layers has a thickness sufficient to provide necessary residence time for an intermediate reaction to complete before the intermediate product converts to a subsequent intermediate or final product.

It is well known that a particular morphology and composition of a catalyst can be better suited to one intermediate reaction step than other reactions. Therefore, multiple catalyst layers 44, 45, 46, 47 and 48 having each layer optimized for one or two intermediate reactions reduces or eliminates the need for engineering tradeoffs demanded by homogeneous catalyst structures and permits optimization for specific reactions.

Finally, electrodes that have been disclosed for use in reactors and cells generating TVF and CCF do not require any membrane and can operate at substantially elevated temperature and pressure (i.e., fuel concentration). This further increases catalyst activity to achieve increased reaction rates at higher voltages and current densities.

To summarize, several benefits of chemical process accelerator systems incorporating TVF-induced high-shear-rate laminar flows at catalyst surfaces include:

Bi-directional mass transport of constituents to and from catalyst surface layers by cross-flow of reactants (e.g. fuel, oxidizer) directly through catalyst structures wetted by TVF-induced high-shear-rate laminar flows, Control of the residence time of reactants at catalyst surfaces to permit very complete reactions, Substantially increased catalyst loading factor and useful catalyzed reaction zone thickness to permit higher area current densities, Layered catalyst compositions and morphologies in coordination with cross-flow fuel/oxidizer transport best suited to the specific intermediate reaction occurring in the zone, Operation of catalysts at higher temperatures, gas pressures and fuel concentrations without significant crossover due to more complete fuel/oxidizer utilization than would be possible with PEM and other crossover barriers, Use of potentially less-expensive active catalyst, and Selection from a wider range of acidic or alkaline fluids capable of sustaining TVF.

These and other advantages will be seen in specific embodiments as further described.

An example will illustrate these advantages. For Direct Methanol Fuel Cells (DMFC), methanol requires as many as five oxidation steps before it reaches its final composition of $CO_2$. The theoretical maximum power and voltage that can be obtained from oxidizing this fuel without irreversible losses is 700 kJ/mol and 1.21 volt at STP. However, catalysts having no rather substantial irreversible energy losses with respect to all five steps and operating at near STP conditions in acidic electrolyte do not yet exist.

Current typical Pt/Ru catalysts require 0.35 to 0.5 volt of irreversible energy (heat producing) overvoltage to promote all 5 steps of the requisite reaction. Consequently, it has not been possible to gain more than 400 to 500 kJ/mol from direct methanol oxidation or an open circuit voltage (OCV) of greater than 0.7 to 0.85 volt. Further, methanol that is not fully oxidized in DMFC will pass freely through PEM and cause additional losses.

Ren, et al, "Recent advances in direct methanol fuel cells at Los Alamos National Laboratory", (Journal of Power Sources 86 (2000) 111-116), reported at Page 113 that 'methanol crossover has been considered a severe barrier to faster development of DMFC technology." They wrote:

The former tool is obvious: with lowering of methanol feed concentration, the rate of crossover drops at zero cell current. The latter tool is more subtle: by using appropriate cell design, a significant drop in methanol crossover can be achieved with increase in cell current, i.e., with increase in rate of anodic consumption of methanol."

In stark contrast to the Ren et al dual expedients of spreading the reaction over a large area to accommodate slow mass transport and lowering the fuel concentration—both of which are needed to accommodate slow catalyst activity and to assure near-total methanol oxidation to mitigate fuel crossover, chemical process accelerator systems of this invention rely on much higher anode reaction rates and fuel concentrations to oxidize methanol and to remove unreacted methanol from cells before there can be any crossover to cell cathodes.

The best Ren et al result reported >90% fuel utilization and an implied crossover of the remainder through PEM with an overall methanol-to-dc conversion efficiency of 37%. Methanol concentration was 0.0005 mol/ml and the polarization relationship (vs. SHE) was 0.18 (Amp) A/cm$^2$ at 0.45 volt with an implied hypothetical OCV of 0.7 volt. These data are useful as estimates of the activity or reaction rate of typical Pt/Ru catalyst surfaces at 333° K for methanol in an acidic environment where reactions are so spread out and dilute that they may be much less subject to mass transport limitations.

The carbon supported catalyst particles at the anode were 50:50% atm. Pt/Ru of 3.5 nm average diameter or a surface area of $3.85 \times 10^{-13}$ cm$^2$ about half of which actually participates in the reaction yielding an active area of about 1924 Å$^2$ (Angstrom$^2$) per catalyst particle. The mean particle density of 17 gm/ml corresponds to a net $3.8 \times 10^{-19}$ gm per particle yielding $2.62 \times 10^{15}$ particles/mg. A 1.0 mg/cm$^2$ electrode loading factor means that each particle is fully 5-fold processing 65 molecules of methanol per second. Therefore, the reaction rate per chemical step must be approximately 3 milliseconds.

At a loading factor of 1.0 mg/cm$^2$ there are 1000 cm$^2$ of catalyst surface for each cm$^2$ of electrode surface, with half of that being available to the reaction. Consequently, the rate metric that can be extracted from the Ren et al data are a catalyst surface current density of 360 μJcm$^2$ and 162 μW/cm$^2$ when the catalyst is successfully processing 93% of the methanol molecules coming to its surface. The computed rate is about 300-times slower than the characteristically slow ORR and 15-times slower than the alkaline model reported in the prior art. This is due to the exceptionally dilute fuel required to prevent crossover and the mass transport interference of opposing flows of fuel feed and escaping CO$_2$ within the anode.

At the methanol dilution and efficiencies described by Ren et al, the available free energy of the fuel is equal to 130 J/ml moving at a velocity of 8.1 nM/sec. to the catalyst surface where there are 65 methanol molecules/sec being fully processed 5 times by each particle. This represents the time required for intermediate specie to move locally to a catalyst surface against a reverse and opposing flow of acid solution carrying CO$_2$, which is a final product that must escape from the fuel cell through the fuel feed stream.

Clearly, the computed reaction metric is a worst-case reaction rate for very dilute 60° C. methanol on Pt/Ru catalysts. Scott, K. et al, "Electrocatalysis in the Direct Methanol Alkaline Fuel Cell" (Liu. H et al, editors, Electrocatalysis of Direct Methanol Fuel Cells, Wiley-VCH, 2009) report at Page 492:

Oxidation kinetics were much better in alkaline than in acid solution; factors of 30 for Pt and 20 for Pt$_2$Ru$_3$ at 0.5V at 333K.

It is difficult to estimate what part of the 4.26 millisecond reaction time is due to the PEM mass transport environment in which the reaction product has to make way for fuel trying to diffuse into the anode; but, at least it is possible to estimate that the reaction time would likely be less than 0.213 milliseconds in alkaline solvent.

A comparison of the Ren et al DMFC with a DMFC of this invention raises a question about requirements for a catalyst surface to be used with concentrated methanol at substantially higher temperature being forced through a catalytic anode into TVF that sweeps away CO$_2$ gas or carbonate ion plus water formed at the anode. In this case, constituent mass transport is fully assisted by the several flows working in a reaction-promoting direction. However, just as it was not possible to extract the mass transport component from the previous calculation, it will not be taken into account in this one—other than to assume it is at least equally negligible. Attention is mainly focused on reasonable catalyst site reaction rate parameters. These will be compared to prior art activation overvoltages in relation to exchange or 'activation' current, $j_0$ in two cells using TVF in alkaline electrolytes.

The thermodynamic Nernst equation can be used to compute increases in free energy due to higher methanol concentrations, temperatures and pressures:

$$\Delta g_f = \Delta g_f^o - RT \ln(\alpha_m \cdot [\alpha_{O2}]^{3/2}/\alpha_{CO2} \cdot [\alpha_W]^2) + T\Delta S$$

where $\alpha_x$ refers to an activity parameter given by a ratio of elevated partial pressure or concentration in the reaction over the value at STP, m and w refer to methanol and water, respectively, $\Delta S$ is an entropy change mainly associated with a constituent phase change of either sign, and the Gibbs energies, $\Delta g$, are all negative.

Dividing through the previous equation by 6F, to account for the 6 electrons in the reaction, yields:

$$E = E^o + (RT/6F)\ln(\alpha_m \cdot [\alpha_{O2}]^{3/2}/\alpha_{CO2} \cdot [\alpha_W]^2) - T\Delta S/6F$$

This equation describes an increase in voltage with temperature and activity of the reactants where E° is 1.21 volts.

The principal contribution to the voltage increment in this case is due to the higher pressure of 95% O$_2$; but, the effect is small, with E≈1.25 volts. A far more significant effect is the influence of temperature and fuel/oxidizer concentration on the rate parameter, $j_0$ and the concomitant decrease in overvoltage or the OCV relative to E. In the Ren et al example, above, an OCV of 0.7 volt reveals a minimum 0.5 volt of irreversible loss.

Applying the Tafel equation:

$$j = j_0 \exp(6\alpha F[\Delta V]/RT)$$

where:

$\alpha$ is the charge transfer coefficient (usually assigned a value of 0.5)

to those values would not provide further insight into that experiment as other losses clearly override any further information it would normally yield.

On the other hand, the overvoltage at a temperature of 533° K will fall to about 0.15 volt as suggested in the prior art. Subtracting a $\Delta V$ of 0.1 volt in the Tafel equation result from the OCV leaves 1.0 volt across the DMFC. The value of $j_0$ can be a reasonable 10 milliamp, which can be easily adjusted by increasing the catalyst loading factor to as high as 1.0 milligram of Pt$_2$Ru$_3$ per reaction processing zone, as described above. Applying these values to the Tafel equation yields a net current density of 10 A/cm$^2$.

Assuming the process just described converts 90% of the fuel feed by means similar to that described by Ren et al., then the net yield with respect to reversible free energy will be 522 kJ/mol. If methanol is forced through the anode at approximately one-half concentration of 12.5 mol/liter in a solution of KOH and the target power density is 10 watts/cm$^2$, then, at 10,075 joules per ml of flowing power density the velocity of the methanol fuel within the reaction zone, if it is converted at the stated efficiency, must be approximately 10 microns/sec.

If there are five layers of individually tailored catalyst and the reaction zone is 50 microns thick, then each of the five intermediate reactions has one second for completion. Such residence times are likely to be adequate. In an acid electrolyte such as $H_3PO_4$, the fuel concentration is closer to 25 mol/liter and the individual reactions would have nearly 2 seconds to complete, which is helpful as reactions are slower in acid.

The prior art overcomes mass transport limitations by spreading the reactions over large areas. DMFC of this invention achieve 10 watts/cm$^2$ or 10 amps/cm$^2$ at 1.0 volt by using alkaline electrolyte. A kilowatt DMFC of this invention requires 100 cm$^2$ of electrode surface area. By comparison a convention DMFC with a similar total power rating and the same net fuel conversion efficiency would require 2000 cm$^2$ anode at 0.5 watt/cm$^2$, which is typical in current practice.

To put this in perspective, an electrode in the high power density example above must process methanol fuel at the rate of $1.9157 \times 10^{-5}$ mol/cm$^2$-sec. of projected electrode. Using the catalyst parameters earlier calculated and the m=1.9 area projection factor for one of the electrode surface designs described above and a porous electrode loading factor of 5.0 milligram/cm$^2$ divided among the 5 zones with 50% of the catalyst surface participating in the reaction, there are 4,750 cm$^2$ of catalyst surface area for every cm$^2$ of electrode area.

Consequently, the average catalyst-surface current density for a DMFC of this invention is a reasonable 2.1 milliamp mA/cm$^2$. The gross methanol molecular processing rate is $4.03 \times 10^{-9}$ mol/cm$^2$-sec. Because the process requires five intermediate steps, the mean specific molecular processing rate increases by a similar factor.

With the average catalyst particle having an effective processing area of $2 \times 10^{-13}$ cm$^2$ or 200 Å$^2$ (Angstrom), the fuel requirement is $8 \times 10^{-22}$ total methanol-mol/particle or about 5 times 482≈2,410 molecules of methanol species intermediate per catalyst particle per second. That means, even though the fuel has several seconds to undergo reaction processing in the electrode reaction zone, the constituent molecules must approach the catalyst particle surface, react and leave that surface in about 4 milliseconds provided the catalyst particle can process at least 10 molecules simultaneously or 1 molecule per 20 Å$^2$. This result is virtually identical to the previous calculation using actual data reported by Ren et al.

It would not be unreasonable to suggest that the exceptional mass transport characteristics of the high-power alkaline DMFC of this invention could function with less catalyst at higher catalyst activity levels. Such high levels of mass transport rate can only be achieved by the TVF-induced high-shear-rate flow mechanisms of this invention and can be further enhanced by 1) somewhat reducing particle size for increased particle number, 2) increasing particle loading by weight, 3) operating at higher temperature or 4) any combination of the preceding.

In order to increase fuel efficiently using PEM in a DMFC, the electrode area must be increased until mass transport no longer limits the molecular reaction rate at the catalyst surface. Spreading the catalyst particles over a much larger area which proportionally increases their number, their cost and the time available for molecular exchange. This is the only available option that limitations of relevant mass transport in the PEM prior art permit. It is worth noting that for a power density of 0.081 watt/cm$^2$, the Ren et al DMFC requires 617 cm$^2$ of electrode area for 50 watts and 617 milligrams of catalyst at the anode. Despite the higher catalyst load factor the high-power DMFC of Case D only needs 5 cm$^2$ and 25 milligrams for the same power.

Chemical process accelerator systems of this invention also improve ORR at fuel cell cathodes. ORR is known to be a major limiting factor in the power density of current state of the art hydrogen/oxygen fuel cells. Actual operating systems generally yield less than 1.0 Amp/cm$^2$ at power levels less than 0.5 watt/cm$^2$. If a theoretical single platinum crystal surface is exposed to ORR chemistry without any mass transport limitation and the current and power densities per cathode size are expressed in per unit area of catalyst surface, then ORR of this invention will be much higher than obtainable with prior art electrodes.

The prior art analysis of ORR is based of quantum density function theory (DFT), which is a computer simulation model for forecasting with several rate limiting intermediate steps in the ORR that reacts adsorbed oxygen into adsorbed water. If the cathode catalyst were perfect, then every intermediate step would move the cathode potential down to its theoretical minimum of −1.23 volts. For a less than perfect catalyst, some of the intermediate steps are uphill thereby adding to the theoretical minimum. In fact, the calculated energy levels yield −0.78 volts at maximum current per unit area of active catalyst surface, scalable as a function of applied voltage.

The parameters are referred to in the prior art as $j_{limit}$, where $eU_0$ and $U^{Max}_{ORR}$ are the maximum theoretical energy for a perfect catalyst at −1.23 volts and the actual maximum energy at −0.78 volts, respectively. The Tafel equation provides a relationship between the hidden exchange current density, $j_0$ at open circuit and $j_{limit}$, which can be measured and is reported to be 96 mA/cm$^2$. Using a voltage difference of −1.23+0.78=−0.45 and a typical electron transfer coefficient of 0.5, then $j_0$ is calculated to be about $2.64 \times 10^{-9}$ Amp/cm$^2$. This is understood to be the open circuit exchange current density at the active portion of catalyst surface at standard temperature.

The Butler-Vollmer version of the Tafel equation provides:

$$j = j_0 \exp(2\alpha F[\Delta V]/RT)$$

where:
F is the Faraday constant (96,485 coulombs/mole), and
R is the universal gas constant (8.314 joules per degree per mole).

What is quite remarkable is that even though the exchange current density is very low, as soon as a ΔV operating voltage drop from the open circuit value is applied, generally about 0.45 volt; the current density increases to 0.1 Amp/cm$^2$, which is understood to be the current density at the active portion of catalyst surface.

Finely divided and dispersed 2 to 5 nm Pt has a gross surface area of 100 M$^2$/gm. With only 20% of the area active to produce electrical current, an area multiple m=5 (or 20 cm$^2$ of catalyst surface per 1.0 cm$^2$ of electrode surface) can be obtained with a Pt catalyst loading factor of 0.1 milligram/cm$^2$ or a 100-times improvement with only 0.5 milligram/cm$^2$ of platinum.

In this example, an ORR cathode would produce 10 Amp/cm$^2$, which is understood to be more resistant to good fuel cell performance than the hydrogen anode. In short, there is no fundamental reason or law of nature that requires electrode current densities to be limited to 1.0 Amp/cm$^2$ at reasonable voltages and power densities other than present catalyst designs and mass transport retardation built into current fuel cells. The chemical process accelerator systems of this invention solve these problems.

Because chemical activity is a function of temperature, the capability of operating at higher temperatures is an important advantage of the chemical process accelerator systems of this invention. Higher temperature-dependent reactions promote higher current densities in fuel cells and higher yields in chemical cells such as reformers. For example, the chemical accelerator systems described here do not require tetrafluoroethylene (maximum operating temperature of 190° C.) or similar materials and therefore are not rate-limited by the maximum operating temperatures of membranes and the like.

Santos et al "Electrochemical Electron Transfer: From Marcus Theory to Electrocatalysis", (Koper, M, editor, *Fuel Cell Catalysis—A Surface Science Approach*, Wiley, 2009), Chapter 2, pp. 31-55 contains an extensive quantum mechanical analysis of electron transfer between a catalyst and a solvent a chemical reaction. The analysis contains a calculation of a potential barrier that must be overcome by an electron and then provides a model of the reaction rate for electron transfer in terms of "high solvent friction", γ, which can be interpreted as in the a) adiabatic limit of high-mass-transport rate, b) high-laminar-shear rate, or c) no-limit on the availability of reactants at the catalyst surface. The parameter for high solvent friction, γ, can be related to any of these. So the simple expression for reaction rate is:

$$k=\gamma \exp(-E_{act}/K_B T) \quad (2.10)$$

where:
$E_{act}$ is the computed potential barrier for the electron to overcome by virtue of a fundamentally thermodynamic Fermi-Dirac probability distribution which, is a function of temperature, and
$K_B$ is Boltzman's constant.

The equation (2.10) clearly shows an increased reaction rate with temperature. However, a key to understanding this relationship is in the interpretation of $E_{act}$. If the potential barrier is unlikely to be overcome by an appreciable population of electrons the formula above is not actually relevant or operative. Santos et al argue that the reason metals are unique as catalysts is that their D-band potential energies are just below the free electron conduction band and therefore can overcome the potential barrier.

The term, $\exp(-E_{act}/K_B T)$, is similar to a term in the Fermi-Dirac probability function. The Fermi-Dirac probability distribution function may be written:

$$f(\xi)=\{1+\exp[(\xi-\varsigma)/K_B T]\}^{-1}$$

where:
ç, is an energy level that has many names and is variously calculated with respect to many baseline references (It can be related to electrochemical potential, the earth and to voltages multiplied by the charge of an electron.), and both parameters in the difference, (ξ-ç) in the probability distribution must have the same reference.

When ç refers to the conduction band of a metal, it is a strong function of temperature and is called the Fermi level. The distribution function provides the probability that an electron in a given energy band (e.g., the D-band) exists near, at or above that level. Santos et al emphasize, at page 49, the importance of means for raising thermal excitation in the catalyst to increase its D-band energy to near the Fermi level in order to reduce significantly energy of activation for catalysis. For chemical process accelerator systems of this invention incorporating catalysts 92, 92', 30, 32, 32f, 32g, 36, 40, 44, 45, 46, 47, 48 containing Group 10 metals, catalyst temperatures of at least 500° C. are recommended.

Note that it is not the sp outer conduction electrons that get transferred in catalysis. The electrons that are quantum-mechanically eligible to move between solvent or reactant molecules and the catalyst must come from bound states. This is an idiosyncrasy of quantum chemistry that escapes many students of the subject. If free electrons could be transferred, then current would flow in a dielectric, which is a much slower process.

Because of the strong temperature dependence of D-band level energies with respect to the Fermi level energies in low-cost catalysts such as nickel and palladium, means for using exothermic energy to heat catalysts can be substituted for expensive platinum catalysts needed by PEM and similar cell reactors. The catalytic surface layer 92 may be entirely heated by gasses entering at makeup gas input port 108. Chemical reactor systems of this invention with their improved mass-transport rates, higher reaction rates, nanoporous metal foam sponges, TVF, CCF, protuberances and elevated temperatures can well surpass the chemical activity per unit of surface area of the prior art.

While the disclosed embodiments include fuel reformers and fuel cells incorporating chemical process accelerator systems comprising catalysts in contact with TVF high-shear-rate laminar flows, it is to be understood that the scope of the invention is not to be limited only to these chemical systems.

I claim:

1. A chemical process accelerator system (10) comprising:
    a. means (92, 92', 96, 97, 97' 116) for generating Taylor Vortex Flows (98, 50a); and
    b. a surface layer (30, 92, 92', 97, 97') of catalyst (92, 92', 30, 32, 32f, 32g, 36, 40, 44, 45, 46, 47, 48) containing protuberances (32, 32f, 32g, 66) that extend into laminar Circular Couette Flows (58) generated by the Taylor Vortex Flows (98, 50a).

2. The chemical process accelerator system (10) of claim 1 wherein:
    a. the surface layer (30, 92, 92', 97, 97') of the catalyst (92, 92', 30, 32, 32f, 32g, 36, 40, 44, 45, 46, 47, 48) is a cylinder-like surface layer (92, 92') adjacent a second cylinder-like surface layer (97, 97'), and
    b. one of the cylinder-like surfaces is rotated to produce the Taylor Vortex Flows (98, 50a) between the two cylinder-like surfaces.

3. The chemical process accelerator system (10) of claim 1 wherein the catalyst (92, 92', 30, 32, 32f, 32g, 36, 40, 44, 45, 46, 47, 48) comprises:
    a metal containing an element selected from the Periodic Table of the Elements Platinum Metals Group.

4. The chemical process accelerator system (10) of claim 1 wherein the catalyst (92, 92', 30, 32, 32f, 32g, 36, 40, 44, 45, 46, 47, 48) comprises:
    a metal containing an element selected from the Periodic Table of the Elements Group 10.

5. The chemical process accelerator system (10) of claim 4 wherein the Group 10 metal comprises:
    nickel.

6. The chemical process accelerator system (10) of claim 1 wherein the Taylor Vortex Flows are created in:
    a hydrogen-rich fuel.

7. The chemical process accelerator system (10) of claim 1 wherein the Taylor Vortex Flows are created in:
    an electrolyte.

8. The chemical process accelerator system (10) of claim 7 wherein the electrolyte comprises:
    an alkaline.

9. The chemical process accelerator system (10) of claim 7 wherein the electrolyte comprises:
    an acid.

10. The chemical process accelerator system (10) of claim 1 wherein the protuberances (32, 32f, 32g, 66):
do not extend into the Taylor Vortex Flows (98, 50a).

11. The chemical process accelerator system (10) of claim 1 wherein the protuberances (32, 32f, 32g, 66) are in:
a hexagonal close packed array.

12. The chemical process accelerator system (10) of claim 1 wherein the protuberances (32f) are:
streamlined.

13. The chemical process accelerator system (10) of claim 1 wherein the protuberances (32, 32f, 32g, 66) comprise:
aggregate clumps of Platinum Metals Group catalyst particles (36) adhered to carbon balls (38).

14. The chemical process accelerator system (10) of claim 1 wherein the protuberances (32, 32f, 32g, 66) comprise:
a nanoporous metal foam sponge (40).

15. The chemical process accelerator system (10) of claim 14 wherein the nanoporous metal foam sponge is:
loaded with catalytic particles (36).

16. The chemical process accelerator system (10) of claim 1 wherein the catalyst (32g) comprises:
multiple layers (44, 45, 46, 47, 48) of different types of catalyst materials.

17. The chemical process accelerator system (10) of claim 16 wherein the catalyst (92, 92', 30, 32, 32f, 32g, 36, 40, 44, 45, 46, 47, 48) comprises:
a metal selected from the Periodic Table of the Elements Platinum Metals Group.

18. The chemical process accelerator system (10) of claim 16 wherein the catalyst (92, 92', 30, 32, 32f, 32g, 36, 40, 44, 45, 46, 47, 48) comprises:
a metal selected from the Periodic Table of the Elements Group 10.

19. The chemical process accelerator system (10) of claim 1 comprising in addition:
means (98, 50a) for extracting unwanted contaminants 64 from the system (10).

20. The chemical process accelerator system (10) of claim 1 comprising in addition:
means for using exothermic energy to heat the catalysts (92, 92', 30, 32, 32f, 32g, 36, 40, 44, 45, 46, 47, 48).

21. The chemical process accelerator system (10) of claim 1 comprising in addition:
means for raising thermal excitation in the catalyst (92, 92', 30, 32, 32f, 32g, 36, 40, 44, 45, 46, 47, 48) to increase its D-band energy level to near the Fermi level in order to reduce significantly energy of activation for catalysis.

22. The chemical process accelerator system (10) of claim 21 wherein the means for raising thermal excitation in the catalyst (92, 92', 30, 32, 32f, 32g, 36, 40, 44, 45, 46, 47, 48) raise catalyst temperatures to:
at least 500° C.

23. The chemical process accelerator system (10) of claim 1 wherein the catalyst (92, 92', 30, 32, 32f, 32g, 36, 40, 44, 45, 46, 47, 48) comprises:
a metal alloy in which one element has been removed by selective dissolution.

24. The chemical process accelerator system (10) of claim 23 wherein the metal alloy comprises:
face-centered-cubic structural geometry.

25. The chemical process accelerator system (10) of claim 23 wherein the face-centered-cubic structural geometry of the metal alloy has:
a Miller Index of (1,1,1).

26. The chemical process accelerator system (10) of claim 1 wherein the catalyst (92, 92', 30, 32, 32f, 32g, 36, 40, 44, 45, 46, 47, 48) comprises:
a metal alloy having a perovskite structure.

27. The chemical process accelerator system (10) of claim 1 wherein the catalyst (92, 92', 30, 32, 32f, 32g, 36, 40, 44, 45, 46, 47, 48) comprises:
a metal alloy containing ruthenium.

28. A chemical process accelerator system (10) comprising:
a. means (92, 92', 96, 97, 97' 116) for generating viscid fluid vortex flows (98, 50a); and
b. a surface layer (30, 92, 92', 97, 97') of catalyst (92, 92', 30, 32, 32f, 32g, 36, 40, 44, 45, 46, 47, 48) containing protuberances (32, 32f, 32g, 66) that extend into high-shear-rate laminar flows (58) generated by the vortex flows (98, 50a).

* * * * *